(12) United States Patent
von der Assen et al.

(10) Patent No.: US 11,523,589 B2
(45) Date of Patent: Dec. 13, 2022

(54) ANIMAL WATERING STATION

(71) Applicant: LUBING Maschinenfabrik Ludwig Bening GmbH & Co. KG, Barnstorf (DE)

(72) Inventors: Markus von der Assen, Steinfeld (DE); Chris Hawk, Hixson, TN (US); John Hawk, Harrison, TN (US); Dustin Hicks, Georgetown, TN (US)

(73) Assignee: LUBING Maschinenfabrik Ludwig Bening GmbH & Co. KG, Barnstorf (DE)

( * ) Notice: Subject to any disclaimer, the term of this patent is extended or adjusted under 35 U.S.C. 154(b) by 219 days.

(21) Appl. No.: 16/823,021

(22) Filed: Mar. 18, 2020

(65) Prior Publication Data
US 2020/0296924 A1 Sep. 24, 2020

(30) Foreign Application Priority Data
Mar. 19, 2019 (DE) ...................... 10 2019 001 866.4

(51) Int. Cl.
*A01K 7/06* (2006.01)
(52) U.S. Cl.
CPC ...................................... *A01K 7/06* (2013.01)
(58) Field of Classification Search
CPC . A01K 7/06; A01K 7/00; A01K 39/02; A01K 39/0213
See application file for complete search history.

(56) References Cited

U.S. PATENT DOCUMENTS

| | | | |
|---|---|---|---|
| 5,138,980 A * | 8/1992 | Ewing .................. | A01K 5/0216 119/61.52 |
| 2004/0069236 A1* | 4/2004 | Kraft ...................... | A01K 39/00 119/51.11 |
| 2011/0073044 A1 | 3/2011 | Cottam et al. | |
| 2015/0136262 A1* | 5/2015 | Willis ................ | A01K 39/0213 137/870 |

FOREIGN PATENT DOCUMENTS

| | | | | |
|---|---|---|---|---|
| CN | 203353406 U | 12/2013 | | |
| CN | 203575329 U | 5/2014 | | |
| CN | 205250105 U | 5/2016 | | |
| DE | 9207415 U1 | 8/1992 | | |
| DE | 102008061994 A1 | 5/2010 | | |
| GB | 1136045 | * 12/1968 | ............ | A01K 39/02 |
| IL | 93180 A | 11/1990 | | |
| KR | 100778279 | * 11/2007 | ............ | A01K 7/025 |
| KR | 100778279 B1 | 11/2007 | | |
| WO | 2019/076476 A1 | 4/2019 | | |

OTHER PUBLICATIONS

Search Report issued in EP20163720 dated Jul. 30, 2020.

* cited by examiner

*Primary Examiner* — Kristen C Hayes
(74) *Attorney, Agent, or Firm* — FisherBroyles, LLP; Keats Quinalty

(57) ABSTRACT

Animal watering stations having a liquid piping system including watering lines, a supply line, and a return line. The supply line supplying liquid simultaneous to all watering lines and the return line returning of liquid to a liquid reservoir. In this way, a circulation of the liquid can be realized in at least parts of the liquid piping system and on the other hand the parallel fluidic circuit of the watering lines enables an easy adapting of the liquid pressure at the drinking valves.

21 Claims, 3 Drawing Sheets

ANIMAL WATERING STATION

CROSS-REFERENCE TO RELATED APPLICATIONS

The present application claims the benefit of German Patent Application No. 102019001866.4, filed Mar. 19, 2019.

INCORPORATION BY REFERENCE

The disclosure of Germany Patent Application No. 102019001866.4, filed Mar. 19, 2019, is hereby incorporated by reference herein for all purposes as if presented in their entirety.

BRIEF DESCRIPTION OF INVENTION

In one aspect, the invention relates to an animal watering station according to the preamble of claim 1.

Animal watering stations of the mentioned kind serve for meeting the water needs of animals, especially livestock, such as poultry. Such animal watering stations are usually constructed such that the animals can themselves meet their water needs.

Primarily in the case of factory farming, especially for poultry, the animal watering stations are designed as so-called line stations. In such animal watering stations, multiple drinking valves are associated with an elongated watering line. The elongated tubular watering line serves to supply the animals with liquid, which is water, but also may be water fortified with additives, such as medication and/or supplements. The drinking valves are designed to dispense water when an animal itself opens the drinking valve, especially by lifting and/or tilting a valve stem of the respective drinking valve.

Various requirements are placed on animal watering stations of the aforementioned kind, especially for the uniformity and/or variability of the water present at the drinking valves and hygiene. The animal watering stations known thus far, designed as line stations, only partly meet the requirements.

One problem which the invention proposes to solve is to create an animal watering station which assures a desired, especially a variable liquid pressure uniformly at all its drinking valves and meets the hygiene requirements.

In one aspect, claim 1 provides multiple watering lines, spaced out alongside each other, each having at least one drinking valve, which can be fed simultaneously from a common supply line with liquid for the water supply of the animals. In addition, there is provided at least one return line for the return of the liquid to the liquid reservoir. Because the adjacent watering lines can be fed with liquid from the same supply line at the same time, a parallel circuit is realized in the fluidic sense. Thanks to this parallel circuit, a larger number of watering lines, especially lines with multiple drinking valves, can be supplied at the same time and/or uniformly with liquid. This ensures a sufficient and uniform liquid supply to all the drinking valves of the multiple watering lines, especially all of the watering lines. Thanks to the at least one return line, a circulating line and/or a conduit ring is assured to create a liquid circulation at least in the supply line, but preferably also in the watering lines, especially in all the watering lines. Therefore, the liquid remains in constant motion in at least the supply line and the at least one return line, even if few or no animals are taking liquid from the drinking valves at the moment, such as at night.

The animal watering station of claim 1 has a liquid circulation.

In one aspect, it is preferably provided to join together fluidically the at least one supply line and the at least one return line. In this way, the respective supply line and the return line connected to it together form a circulation line for a liquid circulation of the drinking liquid. In particular, it is provided to connect fluidically a downstream end of the respective supply line to a starting end, looking in the flow direction, of the return line.

In one embodiment possibility for the animal watering station calls for connecting the ends at one side of the watering lines to a common supply line and to attach the return line to the supply line, looking in the flow direction of the liquid by the supply line. In this way, the supply line has multiple tasks. On the one hand, it serves for supplying the adjacent watering lines, especially all the watering lines of the animal watering station. On the other hand, the supply line together with the attached return line forms the circulation line. The circulation line enables a constant and/or on-demand circulation of liquid through the circulation line formed by the supply line and the attached return line, even when no liquid is being removed from the drinking valves by the animals.

In one aspect, the circulation line is designed and its ends are connected to the liquid reservoir such that one end of the supply line facing toward the liquid reservoir can be fed with liquid from the liquid reservoir and the return line empties by its downstream end in the liquid reservoir for the return of liquid to the liquid reservoir. In this way, a constant liquid circulation is produced in at least the supply line and the return line, including the liquid reservoir.

According to another embodiment possibility of the animal watering station, the liquid inlet ends of the watering lines, preferably in at least one embodiment of all watering lines, are connected fluidically to the common supply line and the ends of the watering lines opposite the liquid inlet ends, preferably of all watering lines, directly or across a collecting line to the return line. In this configuration of the animal watering station, the liquid circulates not only in the supply line and in the return line, but also in the watering lines, preferably in at least one embodiment all watering lines, and optionally also in the collecting line, to which the return line is then attached. In this way, the drinking liquid is constantly circulated in the entire piping system of the animal watering station.

In one aspect, it is preferably provided that the supply line can be fed with liquid from the liquid reservoir and/or liquid flows back from the return line into the liquid reservoir. In this way, liquid is constantly removed from the liquid reservoir and liquid not consumed by the animals is again taken back to the liquid reservoir. This produces a liquid circulation in constant movement in at least a portion of the piping system, especially the liquid piping system, of the animal watering station. Preferably, in at least one embodiment, the liquid reservoir is circulated constantly or at least when demanded or temporarily, so that the liquid reservoir always remains in movement or is at least periodically in movement. This effectively prevents hygiene problems due to stagnant liquid in the liquid reservoir and/or in the piping system of the animal watering station.

In at least one aspect, at least one pump, especially a circulation pump, is provided for the constant or periodic and/or on-demand circulating of the liquid of the animal watering station. Preferably, in at least one embodiment, this is located at the end of the return line before the liquid reservoir, but it is also conceivable to arrange the pump or circulation pump directly in the liquid reservoir by designing the pump or circulation pump as a submersible pump or the like. In this way, the at least one pump sucks in liquid through the circulation piping or the circulation line.

In one embodiment of the animal watering station, the liquid reservoir is formed by at least one liquid reservoir tank. The liquid reservoir tank is supplied with liquid from a liquid source, such as a public water supply, a stall water supply, or other water supply.

In order for the liquid reservoir tank to constantly have a sufficient liquid reservoir, it may be provided that the liquid reservoir in the liquid reservoir tank can be replenished from the liquid source to a maximum level upon reaching a minimum level. Furthermore, it may be provided that not only the maximum level, but also the minimum level, lies above the same level of the watering lines, especially all the watering lines. By establishing this level, especially the minimum and maximum levels, a static pressure is generated and maintained in the liquid reservoir tank, which creates the desired pressure in and/or in front of the drinking valves. In this way, the liquid pressure at the drinking valves is independent of the liquid pressure of the liquid taken from the liquid source to the liquid reservoir tank. Thus, without any kind of additional pressure reducer at the drinking valves, a liquid pressure is adjusted which can be dictated by the liquid level, especially the range between the maximum and minimum liquid level in the liquid reservoir.

A changing of the pressure in or at the drinking valves can be easily done by changing the maximum and minimum liquid level in the liquid reservoir tank, for example, by a corresponding raising or lowering of the liquid tank and/or the liquid reservoir.

According to one optional modification possibility of the animal watering station, the at least one supply line and/or the at least one return line and/or the at least one collecting line are situated at least partly above the maximum liquid level in the liquid reservoir tank and/or the level of the watering lines with their associated drinking valves. Preferably, in at least one embodiment, the watering lines and/or their drinking valves are situated at a common level or a common level range. Downstream from the supply line, watering lines which are further back may be situated slightly lower than the one or more watering lines situated in front of it, in order to compensate for any pressure drop. In this way, any pressure gradient which is present, especially in larger piping systems, particularly in the case of long or many parallel watering lines with a relatively large number of drinking valves, will produce an almost identical liquid pressure at all drinking valves.

Thanks to the arrangement of at least the supply line or at least a portion thereof above the maximum liquid level of the liquid reservoir, the liquid from the liquid reservoir to the drinking valves flows through a kind of gooseneck. As a result, due to the physics of communicating pipes, a liquid pressure is present at the drinking valves which corresponds to the current static liquid pressure of the liquid reservoir and/or in the liquid reservoir tank. When the animals take water from one or more drinking valves, a partial vacuum or negative pressure is created as it were at the drinking valves. This is equalized by further flow of liquid from the liquid reservoir. This further flow of liquid from the liquid reservoir and/or liquid reservoir tank lasts until a liquid pressure is once more established at the drinking valves that corresponds to the static liquid pressure of the liquid reservoir, especially in the liquid reservoir tank.

Preferably, in at least one embodiment, it is provided that the supply line situated higher than the watering lines or at least a portion thereof and/or the collecting line are connected fluidically by vertically or slanting positioned pipes, especially riser pipes and/or downpipes, to opposite ends of the watering lines, which are arranged in parallel in a fluidic sense. In particular, the at least one supply line can be connected by a respective downpipe to the inlet (starting) ends of the watering lines, preferably all watering lines, and/or the opposite, downstream ends of the watering lines can be connected across a respective riser pipe to the collecting line. The riser pipe and/or downpipe connect the at least partly higher situated supply line and/or collecting line to the watering lines situated below the liquid level of the liquid reservoir and their associated drinking valves. This creates goosenecks as it were in front of the inlet ends of all watering lines and behind the downstream ends of the watering lines.

Thanks to the arrangement of the watering lines with the drinking valves below the liquid level of the liquid reservoir, especially in the liquid reservoir tank, the liquid pressure at the drinking valves can be predetermined or adjusted by the height difference of the drinking valves of the watering lines, preferably, in at least one embodiment, all the drinking valves and all the watering lines, to the correspondingly higher liquid level of the liquid reservoir, especially in the liquid reservoir tank.

Preferably, in at least one embodiment, an individual adjustment of the liquid pressure at the drinking valves is possible by changing the liquid level in the liquid reservoir tank. Thus, the liquid pressure can be easily and reliably changed and adapted to the requirements. In this way, the liquid pressure at the drinking valves, preferably, in at least one embodiment, all the drinking valves, can be changed and/or adapted to requirements.

According to one embodiment possibility of the animal watering station, at least one supply line and/or the at least one return line can be vented. The venting is done preferably, in at least one embodiment, at least at one or every highest point of the supply line and/or the return line. This highest point is situated for example at the apex of a supply line and/or return line having a roof-like course or in the area of a gooseneck to form a highest point of the supply line and/or the respective collecting line and/or the return line. The venting ensures that only liquid, especially water, is present in the respective line, preferably, in at least one embodiment, in the entire piping system. In this way, by the principle of gravity and/or the physics of communicating vessels or pipes, the hydrostatic pressure of the liquid can serve for replenishing liquid in the watering lines underneath with their associated drinking valves. Thus, the amount of liquid removed by the animals at the drinking valves is automatically replenished, so that once again the same liquid pressure is adjusted at the drinking valves, corresponding to the hydrostatic pressure of the liquid in the liquid reservoir. The liquid in the piping system free of air or gas, especially in the at least one supply line and/or return line, can thus automatically replenish the watering lines of the drinking valves, even through higher situated piping sections, especially at least partly higher situated sections of the particular supply line and/or return line, in order to maintain the liquid pressure at or in front of the drinking valves as predetermined or adjusted and/or dictated by the liquid level in the liquid reservoir tank.

Another modification possibility of the animal watering station calls for venting the at least one supply line and/or return line by a vacuum, preferably, in at least one embodiment, by an air suction device connected to at least one supply line, collecting line and/or return line. In this way, air or a gas can be specifically suctioned from at least one supply line, the collecting line and/or return line, preferably, in at least one embodiment, at least at one highest point of the at least one supply line, collecting line and/or return line. Thus, the liquid piping system of the animal watering station can be specifically and completely vented from at least one supply line, collecting line and/or return line and in this way the piping system can be entirely cleared of air or some other gas. This contributes to the reliable functioning of the animal watering station according to the invention.

BRIEF DESCRIPTION OF THE DRAWINGS

The following two exemplary embodiments of the invention shall now be explained more closely with the aid of the drawings.

SUMMARY OF THE INVENTION

The animal watering station shown in the figures is designed as a so-called line station. This animal watering station allows the animals to themselves meet their needs for liquid. Such an animal watering station is usually employed in the factory farming of poultry or other small animals.

Figure 1:
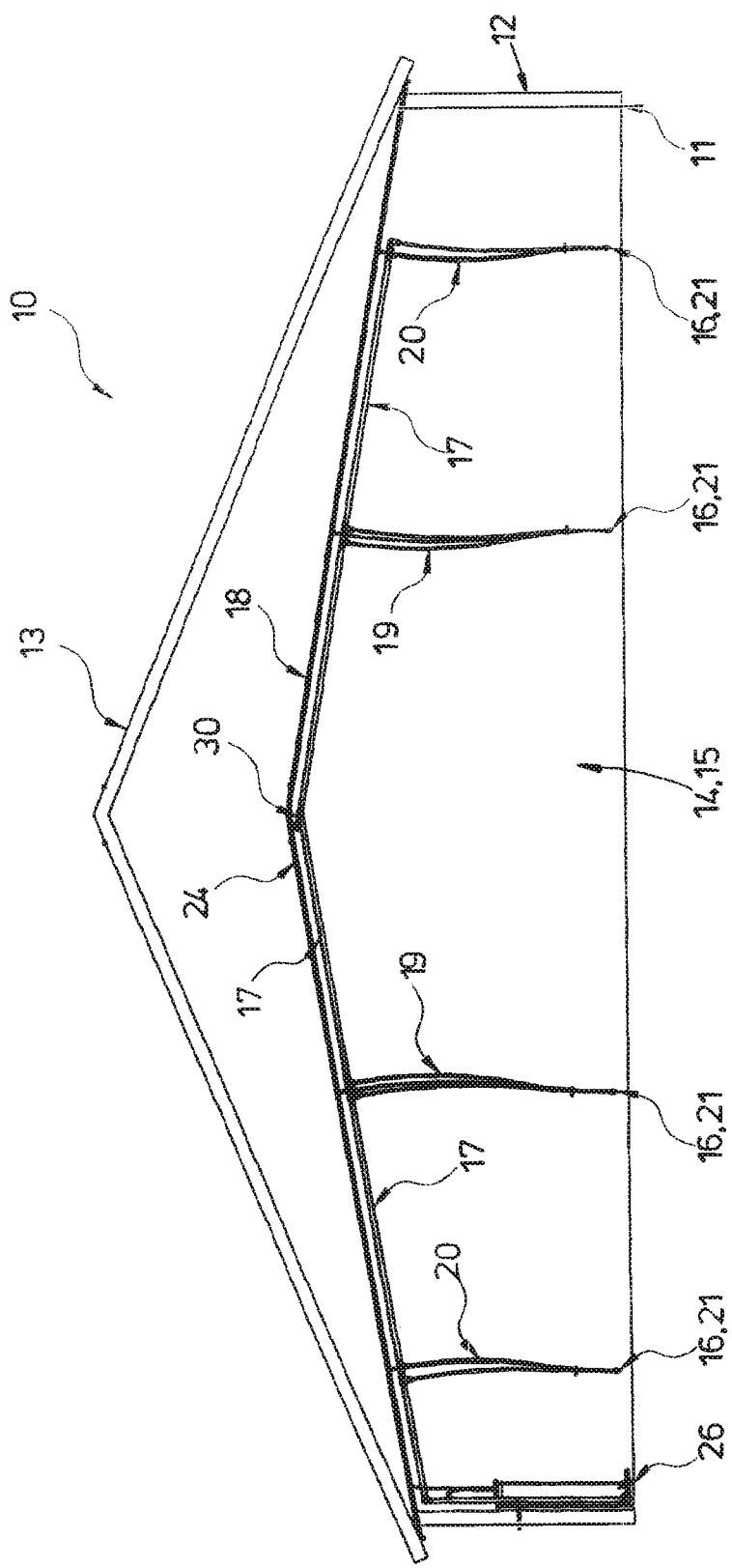
FIG. 1 shows a schematic cross section through a stall with a watering station according to the invention.

The animal watering station is usually arranged in a stall 10. FIG. 1 shows schematically one example of such a stall 10. The stall 10 has a stall floor 11, side walls 12 and a roof 13. The roof 13 shown here is designed as a peaked roof with a relatively shallow inclination. But the stall 10 may also have a different roof shape or be configured other than is shown in FIG. 1.

Figure 2:
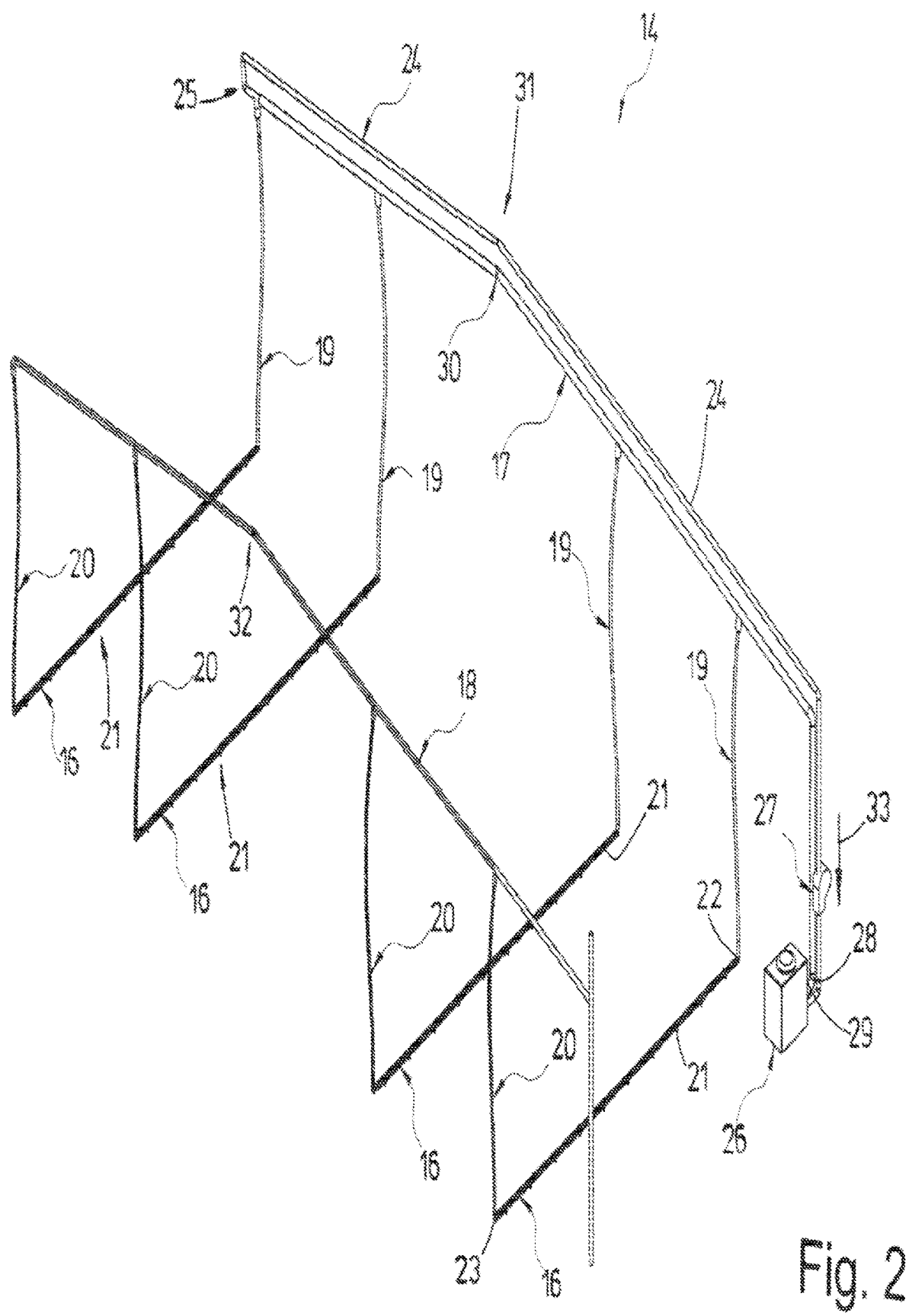
FIG. 2 shows a perspective view of a first exemplary embodiment of the watering station.
Figure 3:
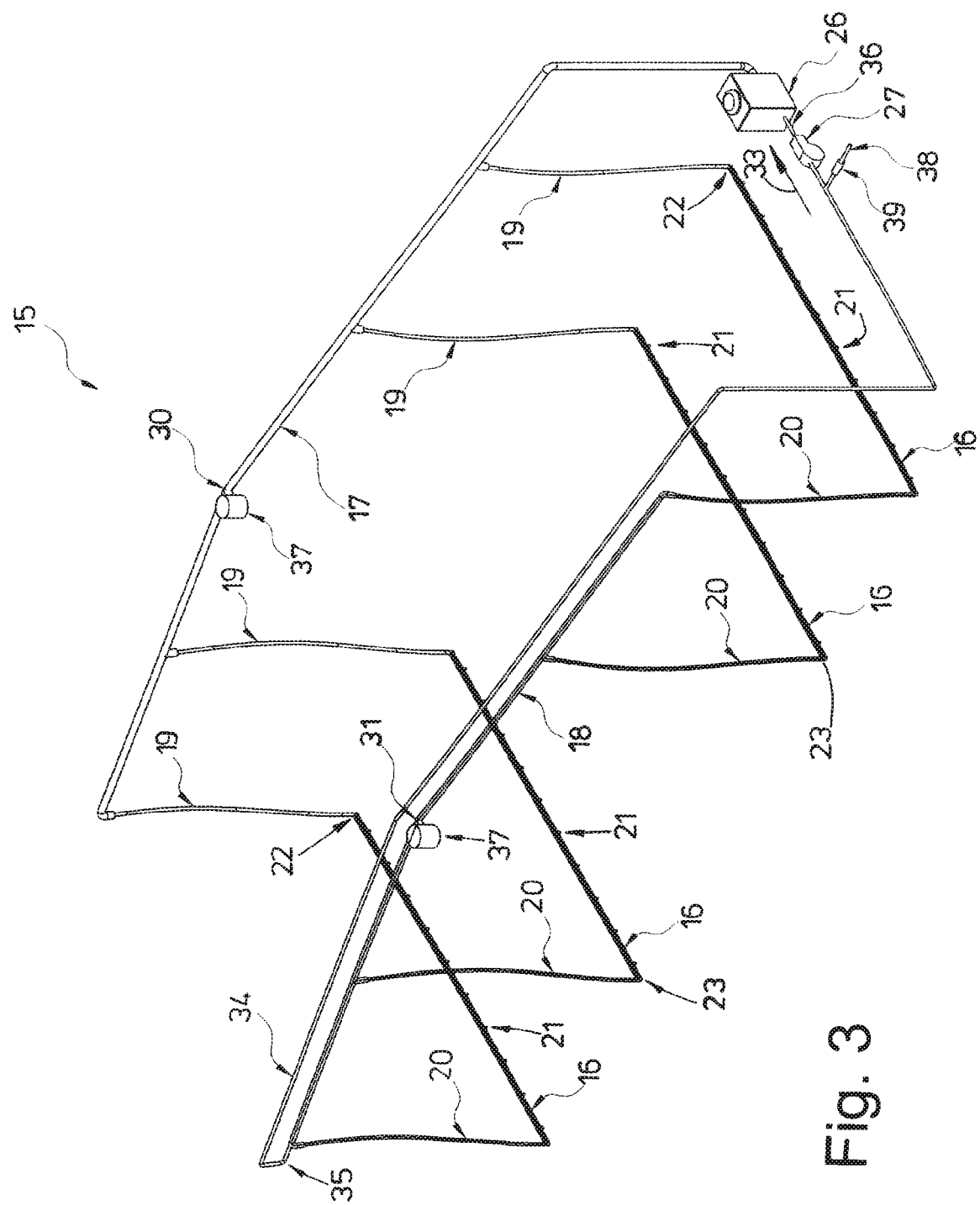
FIG. 3 shows a perspective view of a second exemplary embodiment of the watering station.

The animal watering station has a liquid piping system 14, 15 installed in the stall 10, being shown in perspective in FIGS. 2 and 3. The liquid piping system 14, 15 comprises a plurality of different lines, which are joined together in the manner explained below.

The liquid piping system 14 shown in FIG. 2 and the liquid piping system 15 shown in FIG. 3 in the exemplary embodiments represented each comprise four watering lines 16, a supply line 17, a collecting line 18, downpipes 19 and riser pipes 20. The invention is not confined to four watering lines 16. The liquid piping systems 14 and 15 may have a greater or lesser number of watering lines 16. The watering lines 16 shown in FIGS. 2 and 3 are identically configured, in particular, they have the same length. Alternatively, the watering lines 16 can also be configured differently, in particular, have different lengths. The supply line 17 and the collecting line 18 are also preferably formed as stable pipes, which are laid permanently in the stall 10, being secured for example to suitable structural parts of the stall 10. The downpipes 19 and the riser pipes 20 are preferably formed from flexible tubes.

The cross sections of the watering lines 16, the collecting line 18 and the downpipes 19 are preferably different, the supply line 17 and the collecting line 18 having larger flow cross sections, which may be, for example, 1.5 to 3 times as large as the clear flow cross section of the watering lines 16. The flow cross sections of the downpipe 19 and the riser pipe 20 correspond either to those of the supply line 17 and the collecting line 18 or to those of the watering lines 16. Additionally, the flow cross sections of the downpipe 19 and the riser pipe 20 can be between the differently sized flow cross sections of the supply line 17 and the collecting line 18 on the one hand and the watering lines 16 on the other hand.

The watering lines 16 in the stall 10 are suspended from cables, not shown in the figures, and at a distance above the stall floor 11 corresponding to the height of the animals. The watering lines 16 preferably, in at least one embodiment, run horizontally, i.e., at a parallel spacing from the horizontal stall floor 11. In the exemplary embodiment shown, the distances of all watering lines 16 from the stall floor 11 are the same, so that all four watering lines 16 lie in a plane extending at parallel distance above the stall floor 11. The watering lines 16 are arranged at a spacing from each other. In the exemplary embodiment shown, all watering lines 16 run parallel to each other, and each time an outer pair of watering lines 16 has less spacing from each other than the interior watering lines 16, but the invention is not confined to this. Instead, the invention is suited to any desired arrangements of the watering lines 16 can be disposed relative to each other. Additionally, the neighbouring watering lines 16 to not run parallel to each other. One aspect is that the watering lines 16 can be arranged with a spacing alongside each other.

As shown in the figures, each of the preferably identically configured watering lines 16 is provided with drinking valves 21. The identically configured watering lines 16 in the exemplary embodiment shown have an equal number of drinking valves 21, where the spacing between neighbouring drinking valves 21 can always be roughly the same. But a different distribution of the drinking valves 21 along the watering lines 16 is also possible. The number of drinking valves 21 per watering line 16 can also vary as desired.

As shown in the figures, the identical drinking valves 21 can be screwed in from the bottom into the watering lines 16 having preferably a square or rectangular cross section and can be thereby joined to the bottom of the watering lines 16. The drinking valves 21, which are known in themselves, have a valve stem, partly protruding from their housing at the bottom, which the animals can lift and/or tilt at the lower free end. By this lifting and/or tilting, the animals can open the respective drinking valve 21 for the dispensing of liquid. The liquid can be pure water, or also water with additives, such as medication, nutrients or the like. After releasing the valve stem, the drinking valve 21 closes automatically. Other valve configurations are encompassed herein as long as such valve configurations enable dispensing of liquid(s) from the watering lines 16.

Liquid inlet ends 22 of the watering lines 16 are fluidically connected by downpipes 19 to the supply line 17. The supply line 17 runs roughly transversely to the watering lines 16. Preferably, in at least one embodiment, the longitudinal axis of the supply line 17 lies on an imaginary line on which the liquid inlet ends 22 of all watering lines 16 lie, said watering lines 16 being situated in succession with a spacing and transversely to the longitudinal direction of the supply line 17. In this way, there is a simultaneous supplying of all watering lines 16 with liquid from the supply line 17. This corresponds fluidically to a parallel circuit or parallel supplying of all watering lines 16 from the common supply line 17. Thus, by contrast with a fluidically serial supplying, the individual watering lines 16 are not supplied with liquid in succession from the supply line 17, but rather at the same time or simultaneously.

In at least one embodiment, the downstream ends opposite the fluid inlet ends 22 or the fluid outlet ends 23 of all watering lines 16 are fluidically connected to the collecting line 18. This connection is made in principle analogously to the connection of the supply line 17 to the liquid inlet ends 22 of the watering lines 16. Accordingly, the collecting line 18 runs parallel to the supply line 17 and likewise, like the supply line 17, transversely to the watering lines 16. The connection of the liquid outlet ends 23 of all watering lines 16 to the collecting line 18 occurs across riser pipes 20 between liquid outlet ends 23 of all watering lines 16 and corresponding connections of the riser pipes 20 to the collecting line 18, which are spaced apart successively in the flow direction of the collecting line 18. Thanks to this kind of connection of the liquid outlet ends 23 of the watering lines 16 to the collecting line 18, liquid from all the watering lines 16 can arrive together and possibly simultaneously in the collecting line 18. Therefore, the connection of the liquid outlet ends 23 of the watering lines 16 to the collecting line 18 likewise constitutes a parallel circuit or a parallel supplying in the fluidic sense.

The supply line 17 is coordinated with a return line 24. The return line 24 extends across the entire length of the supply line 17. In the exemplary embodiment shown, the return line 24 extends parallel to the supply line 17, namely, along it. But the return line 24 may also run next to the supply line 17 or also antiparallel to it. It is also possible for the supply line 17 and the return line 24 to be merged together, forming a parallel line with two flow ducts.

The supply line 17 is connected to or continued by a start of the return line 24 at its downstream end 25. In this way, the supply line 17 and the associated return line 24 together form a circulation line, enabling a circulation of liquid in the supply line 17 and also the return line 24 in the flow direction 33. This circulation may be constant or periodic only in desired intervals of time.

The animal watering station has a liquid reservoir 26, which is preferably, in at least one embodiment, formed as a liquid storage or a liquid reservoir tank and/or can be accommodated in such. The liquid reservoir 26 in the liquid reservoir tank can be replenished on demand through an inlet from a liquid source, not shown, such as a public water supply, a household water supply, or a mixing tank, where fresh water can be mixed with additives, such as nutrients and/or medication. But it is also conceivable for the additives to be added or dispensed and mixed in the liquid reservoir 26, especially the liquid reservoir tank.

The supplying of liquid, especially water, to the liquid reservoir 26, especially the liquid reservoir tank, is preferably, in at least one embodiment, done on demand, namely, controlled by the level of the liquid reservoir 26, especially the liquid in the liquid reservoir tank. The control system ensures that the liquid reservoir 26 constantly has a minimum level. Once this is reached, liquid or water is filled in from the outside until reaching a maximum level of the liquid reservoir 26, especially a maximum liquid level in the liquid reservoir tank. Preferably, in at least one embodiment, the maximum and minimum levels can be changed as needed, in order to adapt the liquid pressure present at the drinking valves 21, of preferably all the watering lines 16, to the requirements.

In at least one embodiment, a start 28 of the supply line 17 serving for the liquid supply is connected fluidically to the liquid reservoir 26, especially to the liquid reservoir tank. Likewise, an end 29 of the return line 24 is connected to the liquid reservoir 26, especially to the liquid reservoir tank. In this way, a closed liquid circulation is produced by the supply line 17, the return line 24 continuing this in the flow direction, and the connection of the start 28 or end 29 of the latter to the liquid reservoir 26, especially the liquid reservoir tank, in order to bring about a circulation of liquid in the mentioned lines and in the liquid reservoir tank.

The liquid in the supply line 17 and in the return line 24 is circulated by a pump 27 in the flow direction 33. This may occur continuously or also discontinuously within set time intervals or on demand. In the exemplary embodiment shown, the pump is associated with the return line 24. It is located, in the flow direction of the liquid through the return line 26, shortly before the end 29 of the latter and thus in the vicinity or possibly also at the entrance of the end 29 of the return line 24 in the liquid reservoir 26, especially the liquid reservoir tank.

The supply line 17 in the exemplary embodiment of FIG. 2 and also the collecting line 18 as well as the return line 24 are provided with a flat, V-shaped course, similar to the roof 13 of the stall 10. This produces at the central or roughly the central apex point of the supply line 17, the collecting line 18 and the return line 24 a respective highest point 30, 31, 32. A venting is provided at least at one of the highest points, especially at the highest point 30 of the supply line 17. If a venting is provided only at the highest point 30, the collecting line 18 and the return line 24 do not need to have any higher situated highest points 31, 32. Air can escape from the liquid piping system 14 thanks to the venting of at least the highest point 30. As a result, the liquid in the animal watering station according to the invention can flow through the liquid piping system 14 by gravity from the liquid reservoir 26, especially its liquid reservoir tank, to all the drinking valves 21 in all the watering lines 16. The liquid flows automatically under gravity by the physics of communicating pipes to the drinking valves 21 in all the watering lines 16 to replenish wherever liquid is removed by the animals. The liquid removed by the animals at the drinking valves 21 is virtually replenished automatically. The pump 27 is not needed for this; it only serves to bring about a liquid circulation.

In order for the static pressure of the liquid in the liquid tank produced by the fill level of the liquid reservoir 26 to also be present uniformly at all watering lines 16 of their associated drinking valves 21, the liquid level of the liquid reservoir 26 is chosen such that the static pressure of this liquid level corresponds to the desired liquid pressure at the drinking valves 21 of all the watering lines 16. Accordingly, the liquid reservoir 26, especially the liquid reservoir tank, is situated so high above the stall floor 11 and the minimum level of the liquid reservoir 26 is such that these are above the level of the watering lines 16 and all their associated drinking valves 21. This level difference will be larger as a greater liquid pressure is needed at the drinking valves 21.

If it is desired to change the pressure at the drinking valves 21, this can be done by designing a liquid reservoir 26 with variable spacing from the stall floor 11, in particular, such that the liquid tank can be raised or lowered, or the maximum and minimum levels of liquid in the liquid tank can be changed by an appropriate control of the intake of liquid in the liquid tank.

FIG. 3 shows the liquid piping system 15 according to a second exemplary embodiment of the invention. This liquid piping system 15 differs from the liquid piping system 14 of FIG. 2 basically only by a different return line 34. This return line 34 is associated with the collecting line 18. For this, a downstream end 35 of the collecting line 18 is connected to the start of the return line 34. Accordingly, in the exemplary embodiment of FIG. 3, the collecting line 18 and the return line 34 form the circulation line.

A rear, downstream end 36 of the return line 34, looking in the flow direction 33, is connected to the liquid reservoir 26, especially fluidically to the liquid reservoir tank. The pump 27 in this exemplary embodiment is provided shortly before the downstream end 36 of the return line 34. This produces in the animal watering station of FIG. 3 a liquid circulation encompassing the entire liquid piping system 15. Whereas in the exemplary embodiment of FIG. 2, the circulation of the liquid occurs only in the supply line 17, the return line 24 and the liquid reservoir 26, the association of the return line 34 with the collecting line 18 produces a circulation of the liquid in the entire liquid piping system 15, i.e., not just in the supply line 17, the collecting line 18 and the return line 34, but also in the downpipes 19, the riser pipes 20 and the watering lines 16, especially all watering lines 16.

In the liquid piping system 15 of FIG. 3, the highest point 30 of the supply line 17 and the highest point 31 of the collecting line 18 are associated with symbolically represented vent valves 37. Furthermore, the return line 34 has an air suction port 38, which can be associated with a vacuum device 39.

The present embodiments of the invention can be understood more readily by reference to the instant detailed description, examples, and claims. It is to be understood that these embodiments of the invention are not limited to the specific systems, devices, and/or methods disclosed unless otherwise specified, as such can, of course, vary. It is also to be understood that the terminology used herein is for the purpose of describing particular aspects only and is not intended to be limiting.

The instant description of the embodiments of the invention are provided as enabling teachings of the invention in the best, currently known aspects. Those skilled in the relevant art will recognize that many changes can be made to the aspects described, while still obtaining the beneficial results of the present embodiments of the invention. It will also be apparent that some of the desired benefits of the present embodiments of the invention can be obtained by selecting some of the features of the present embodiments of the invention without utilizing other features. Accordingly, those who work in the art will recognize that many modifications and adaptations to the present embodiments of the invention are possible and can even be desirable in certain circumstances and are a part of the present embodiments of the invention. Thus, the instant description is provided as illustrative of the principles of the present embodiments of the invention and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the embodiments of the invention have been disclosed in the foregoing specification, it is understood by those skilled in the art that many modifications and other aspects of the embodiments of the invention will come to mind to which the invention pertains, having the benefit of the teaching presented in the foregoing description and associated drawings. It is thus understood that the embodiments of the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described embodiments of the invention.

LIST OF REFERENCE NUMBERS

10 Stall
11 Stall floor
12 Side wall
13 Roof
14 Liquid piping system
15 Liquid piping system
16 Watering line
17 Supply line
18 Collecting line
19 Downpipe
20 Riser pipe
21 Drinking valve
22 Liquid inlet end
23 Liquid outlet end
24 Return line
25 Downstream end
26 Liquid reservoir
27 Pump
28 Start
29 End
30 Highest point
31 Highest point
32 Highest point
33 Flow direction
34 Return line
35 Downstream end
36 Downstream end
37 Vent valve
38 Air suction port
39 Vacuum device

The invention claimed is:

1. A watering station with multiple drinking valves for removal of liquid by animals, the watering station comprising:
    a liquid piping system including watering lines, at least one supply line, and at least one return line,
    the watering lines being associated with drinking valves and having a liquid supply,
    wherein the at least one supply line simultaneously supplies liquid to the watering lines in parallel with the at least one return line returning at least a portion of the liquid to the liquid supply;
    wherein at least the at least one supply line is situated higher than the watering lines and are connected fluidically by riser pipes and downpipes to opposite ends of the watering lines and the watering lines are arranged alongside and at a distance from one another.

2. The watering station of claim 1, wherein the at least one supply line and the at least one return line are joined together to form a circulation line for the liquid.

3. The watering station of claim 2, wherein the ends at one liquid supply side of the watering lines are connected fluidically to the at least one supply line and the at least one return line is connected to a downstream end of the at least one supply line.

4. The watering station of claim 1, wherein liquid inlet ends of the watering lines are connected to the at least one supply line and opposite liquid outlet ends of the watering lines are connected directly or across a collecting line to the at least one return line.

5. The watering station of claim 4, wherein the at least one supply line is connected by a respective downpipe to the inlet ends of the watering lines and the downstream ends of the watering lines are connected to the collecting line.

6. The watering station of claim 4, wherein at least the collecting line is vented.

7. The watering station of claim 6, wherein at least the collecting line is laid such that at least one point forms a highest point and the collecting line is vented at the highest point.

8. The watering station of claim 6, wherein the collecting line is vented by a vacuum generator which is connected to the highest point of the collecting line.

9. The watering station of claim 1, wherein the at least one supply line is fed with the liquid from the liquid supply.

10. The watering station of claim 1, wherein the liquid flows from the at least one return line into the liquid supply.

11. The watering station of claim 1, wherein a pump is arranged in the at least one return line before the liquid supply.

12. The watering station of claim 1, wherein the liquid supply is formed by at least one liquid tank.

13. The watering station of claim 12, wherein the liquid in the liquid tank is filled to a maximum level upon reaching a minimum level.

14. The watering station of claim 1, wherein at least the at least one supply line and the at least one return line are situated at least partly above a maximum liquid level of the liquid in the liquid supply.

15. The watering station of claim 1, wherein at least the at least one supply line and the at least one return line are situated at least partly above the level of the watering lines.

16. The watering station of claim 1, wherein the liquid pressure at the drinking valves is predetermined by the height difference of the watering lines with the drinking valves and the higher liquid level in the liquid supply.

17. The watering station of claim 1, wherein the liquid pressures at the drinking valves of the watering lines are determined by the liquid level in the liquid supply.

18. The watering station of claim 1, wherein at least the supply line is vented.

19. The watering station of claim 18, wherein at least the at least one supply line is laid such that at least one point forms a highest point and the at least one supply line is vented at the highest point.

20. The watering station of claim 18, wherein the at least one supply line is vented by a vacuum generator which is connected to the highest point of the at least one supply line.

21. A watering station with multiple drinking valves for removal of liquid by animals, the watering station comprising:
 a liquid piping system including watering lines, at least one supply line, and at least one return line,
 the watering lines being associated with drinking valves and having liquid supplied at a starting end,
 wherein the at least one supply line simultaneously supplies the liquid to the watering lines in parallel with the at least one return line returning at least a portion of the liquid to the starting end,
 wherein the at least one supply line is situated higher than the watering lines, is connected fluidically by riser pipes and downpipes to opposite ends of the watering lines, and the watering lines are arranged alongside and at a distance from one another.

\* \* \* \* \*